United States Patent
Ogata et al.

(10) Patent No.: US 6,408,838 B1
(45) Date of Patent: Jun. 25, 2002

(54) ROTARY CUTTING SAW WITH SLITS SHAPED FOR MINIMIZING WEAR OF NECK PORTION

(75) Inventors: Seiya Ogata; Hitoshi Makihara, both of Fukuoka-ken (JP)

(73) Assignees: Noritake Diamond Industries, Co., Ltd., Ukiha-gun; Noritake Co., Ltd., Nagoya, both of (JP)

( * ) Notice: Subject to any disclaimer, the term of this patent is extended or adjusted under 35 U.S.C. 154(b) by 74 days.

(21) Appl. No.: 09/603,187

(22) Filed: Jun. 26, 2000

(30) Foreign Application Priority Data

Jul. 5, 1999 (JP) .......................................... 11-190968

(51) Int. Cl.[7] .................................................. B28D 1/04
(52) U.S. Cl. ............................. 125/15; 125/22; 451/547
(58) Field of Search ................................ 125/12, 13.01, 125/15, 22; 451/540, 547

(56) References Cited

U.S. PATENT DOCUMENTS

| | | | | |
|---|---|---|---|---|
| 4,930,487 A | * | 6/1990 | Younger | 125/15 |
| 5,197,453 A | * | 3/1993 | Messina | 125/15 |
| 5,507,273 A | * | 4/1996 | Chiuminatta | 125/13.01 |

FOREIGN PATENT DOCUMENTS

| | | | | |
|---|---|---|---|---|
| JP | Y2-56-36967 | | 8/1981 | |
| JP | 11-110563 A | * | 6/1984 | ............ 125/15 |
| JP | A-59-110563 | | 6/1984 | |
| JP | Y2-1-31422 | | 9/1989 | |
| JP | U-5-5355 | | 1/1993 | |

* cited by examiner

Primary Examiner—Timothy V. Eley
(74) Attorney, Agent, or Firm—Oliff & Berridge PLC (57) ABSTRACT

A rotary cutting saw comprising: a base disk; and a plurality of abrasive segments which are bonded to an outer circumferential surface of the base disk so as to be spaced apart from each other in a circumferential direction of the base disk. The base disk has a plurality of slits which are formed in the outer circumferential surface of the base disk so as to be located between the abrasive segments in the circumferential direction. Each of the slits is defined by a pair of side surfaces opposed to each other in the circumferential direction, and a part-cylindrical surface defining a part of a cylinder whose axis is parallel to the axial direction. The part-cylindrical surface has a circumferential width which is larger than a circumferential distance between the radially inner end portions of the side surfaces. The part-cylindrical surface is smoothly connected to one of the side surfaces without a stepped portion therebetween.

12 Claims, 5 Drawing Sheets

ROTARY CUTTING SAW WITH SLITS SHAPED FOR MINIMIZING WEAR OF NECK PORTION

BACKGROUND OF THE INVENTION

1. Field of the Invention

The present invention relates in general to a rotary cutting saw which includes a base disk and a plurality of abrasive segments bonded to the outer circumferential surface of the base disk and which is used for cutting, parting or grinding an asphalt, a concrete, a building material or other work material. More particularly, the invention is concerned with such a cutting saw having slits formed in the outer circumferential surface of the base disk and located between the abrasive segments.

2. Discussion of the Related Art

There is known a rotary cutting saw 110, as shown in FIG. 6, consisting principally of a base disk 111 which is made of a tool steel or other metallic material, and a plurality of abrasive segments 112 which are bonded to the outer circumferential surface of the base disk 111 so as to be circumferentially spaced apart from each other at a constant angular interval therebetween. In portions of the outer circumferential surface of the base disk 111 each of which is located between adjacent ones of the abrasive segments 112, there are formed cutouts or slits 113 each of which extends inwardly in the radial direction of the base disk 111 from the outer circumferential surface of the base disk 111, and also in the axial direction of the base disk 111 over the entire axial length of the base disk 111. Each abrasive segment 112, which is referred to also as a segment chip, consists of a small piece including diamond abrasive grains or other super abrasive grains which are held together with a metal bond or other bonding agent. This rotary cutting saw 110 is a tool which is generally referred also to as a cutting blade, a rotary blade, a cutting grindstone or a grinding wheel, and which is generally used for cutting, parting or grinding an asphalt, a concrete, a building material or other work material, for example.

Each slit 113 is defined by a pair of opposed side surfaces 113*a*, 113*b* and a part-cylindrical surface 113*c*. The side surfaces 113*a*, 113*b* are opposed to each other and parallel to the radial direction of the base disk 111. The part-cylindrical surface 113*c* defines a part of a cylinder having an axis which is parallel to the axial direction of the base disk 111 and which lies on a center plane between the side surfaces 113*a*, 113*b*. The part-cylindrical surface 113*c* connects radially inner end portions of the respective side surfaces 113*a*, 113*b*. The slits 113 facilitate dissipation or radiation of a heat generated when the abrasive segments 112 are bonded to the base disk 111, thereby preventing the base disk 111 from being affected by the heat. The slits 113 permit, during a cutting or parting operation with the rotary cutting saw 110, a cutting fluid to be easily applied to a cutting point at which the work material is cut by the abrasive segments, and also permit cutting chips that are produced at the cutting point to be removed from a groove being currently formed in the work material, thereby improving the cutting or parting performance of the rotary cutting saw 110.

The rotary cutting saw 110 suffers from a drawback, particularly, when used in successive or repeated operations for cutting or parting the work materials. That is, the cutting chips produced in the cutting operations tend to be concentrated in a "neck" portion of the rotary cutting saw 110, i.e., a radially outer end portion of the base disk 111 which is radially adjacent to the abrasive segments 112, whereby the neck portion is worn and thinned due to rubbing thereof against the cutting chips, possibly causing breakage of the abrasive segments 112.

In view of the above drawback, there has been proposed a rotary cutting saw, as disclosed in JP-Y-56-36967 and JP-Y-01-31422, which includes wear-resistant chips made of a cemented carbide or ceramic material having a high degree of wear resistance. Each wear-resistant chip is bonded to one of the opposed side surfaces of the corresponding slit, in the interest of reducing wear of the neck portion of the rotary cutting saw.

There has been also proposed a rotary cutting saw, as disclosed in JP-A-59-110563 and JP-U-05-5355, which includes wear-resistant chips having respective lengths different from each other, and slits having respective depths or radial lengths different from each other. Each wear-resistant chip, which is made of cemented carbide or ceramic material, is bonded to one of the opposed side surfaces of the corresponding slit whose radial length corresponds to the length of the wear-resistant chip. This construction prevents flows of the cutting chips along a single circle having a given radius, namely, prevents the cutting chips from being concentrated at a single radial portion of the base disk, and facilitates the cutting chips to be dispersed so as to be distributed into a plurality of radial portions of the base disk, e.g., a plurality of mutually concentric circles having different radii, so that amount of wear of the neck portion of the rotary cutting saw is reduced.

However, in each of the above-described conventional rotary cutting saw in which the wear-resistant chip is bonded to one of the opposed side surfaces of each slit, a plurality of small turbulent or eddy flows of the cutting chips are generated in each slit during a cutting operation, due to the presence of a stepped or protruding portion in the inner surface of the slit, thereby impeding entrance of the cutting chips into the slits and accordingly causing the cutting chips to stay in the groove being currently formed in the work material. A portion of the base disk which portion is adjacent to the wear-resistant chip, i.e., the neck portion of the rotary cutting saw is still likely to be somewhat worn by the cutting chips staying in the currently formed groove of the work material. That is, the wear in the neck portion is not satisfactorily prevented even in the above-described known cutting saw. Further, the wear-resistant chip bonded to one of the side surfaces of the slit inevitably reduces a spacing between the side surfaces. The reduced spacing between the side surfaces of the slit causes a reduced efficiency of discharge of the cutting chips from the currently formed groove and a reduced efficiency of application of the cutting fluid to the cutting point, thereby resulting in a reduced cutting efficiency or a reduced durability of the cutting saw.

SUMMARY OF THE INVENTION

It is therefore an object of the present invention to provide a rotary cutting saw constructed to reduce an amount of wear of its neck portion without deteriorating its cutting performance.

Various studies conducted by the present inventors under the above-described situation revealed that the wear of the neck portion of the cutting saw is reduced by suitably designing the shape of each slit formed in the outer circumferential surface of the base disk of the cutting saw. For example, the inventors found a fact that the wear of the neck portion is advantageously reduced where the opposed side surfaces of the slit are connected at their respective radially inner end portions to the part-cylindrical surface which has an inside diameter larger than a circumferential distance between the radially inner end portions of the opposed side surfaces, such that one of the side surfaces is smoothly connected to the part-cylindrical surface without a stepped or protruding portion therebetween.

It is assumed that, in a cutting operation with the conventional cutting saw, a plurality of small eddy flows of the produced cutting chips with a cutting (cooling) fluid are generated within each slit, and the time for which the cutting chips stay in the slit is generally reduced due to turbulent flows occurring as a result of mutual collisions of the small eddy flows. That is, the turbulent flows tend to undesirably cause movements of the cutting chips out of each slit, so that most of the cutting chips are likely to be discharged from each slit, before a certain amount of angular displacement of the cutting saw relative to the work material is completed after the production of the cutting chips, namely, before the slit comes out of the currently formed groove with the rotation of the cutting saw after the production of the cutting chips. In other words, the turbulent flows tend to impede movements of the cutting chips into each slit, so that most of the cutting chips are unlikely to be caught in each slit before the slit comes out of the currently formed groove after the production of the cutting chips.

The above-described fact found by the present inventors is explainable by assuming that a small number of comparatively large eddy flows (e.g., a single flow) of the cutting chips are formed, in place of the turbulent flows, within each slit where the part-cylindrical surface is smoothly connected to one of the side surfaces without a stepped or protruding portion, and that the time for which the cutting chips stay in the slit is generally increased owing to the large eddy flow. That is, the large eddy flow tend to advantageously impede movements of the cutting chips out of each slit, or facilitate movements of the cutting chips into each slit, so that the ratio of ones of the produced cutting chips, which are caught in each slit and then carried by each slit out of the currently formed groove, to the entirety of the produced cutting chips is increased. Thus, an increased amount of the cutting chips are discharged from the groove after the slit comes out of the groove, thereby minimizing an amount of the cutting chips forced to be displaced into a small gap between the base disk and each side surface of the currently formed groove, and accordingly resulting in a reduced amount of wear of the base disk.

The above object may be achieved according to the principle of the present invention, which provides a rotary cutting saw comprising: a base disk; and a plurality of abrasive segments which are bonded to an outer circumferential surface of the base disk so as to be spaced apart from each other in a circumferential direction of the base disk; wherein the base disk has a plurality of slits which are formed in the outer circumferential surface of the base disk so as to be located between adjacent ones of the abrasive segments in the circumferential direction, each of the plurality of slits extending inwardly in a radial direction of the base disk from the outer circumferential surface of the base disk, and extending in an axial direction of the base disk over an entire axial length of the base disk; wherein each of the slits is defined by a pair of side surfaces opposed to each other in the circumferential direction, and a part-cylindrical surface defining a part of a cylinder having an axis which is parallel to the axial direction, the side surfaces being connected at radially inner end portions thereof to the part-cylindrical surface; wherein the part-cylindrical surface has a width as measured in the circumferential direction, which width is larger than a circumferential distance between the radially inner end portions of the side surfaces; and wherein the part-cylindrical surface is smoothly connected to one of the side surfaces without a stepped portion therebetween.

In the rotary cutting saw of the present invention, the opposed side surfaces of each slit are connected at their respective radially inner end portions to the part-cylindrical surface that has the circumferential width larger than the circumferential distance between the radially inner end portions of the side surfaces, and the part-cylindrical surface is smoothly connected to one of the side surfaces without a stepped portion therebetween. According to this arrangement, there is formed a single or small number of large eddy flow within each slit during a cutting operation. The large eddy flow advantageously impedes movements of the cutting chips out of each slit, or facilitates movements of the cutting chips into each slit, so that an increased amount of the cutting chips are caught in each slit and then carried by each slit out of the currently formed groove so as to be discharged from the groove after the slit comes out of the groove, thereby resulting in a reduced amount of wear in the neck portion of the base disk. This advantage can be obtained, for example, even without bonding a wear-resistant chip to one of the side surfaces of the slit. Therefore, the rotary cutting saw of the present invention does not suffer from a reduced efficiency of discharge of the cutting chips from the currently formed groove or a reduced efficiency of application of the cutting fluid to the cutting point, which would be caused by the presence of the wear-resistant chip, and which would reduce the cutting performance and the durability of the cutting saw. It is noted that the cylinder partially defined by the part-cylindrical surface of each of the slits may have a circular shape or an elliptical shape in a cross section perpendicular to the axial direction of the base disk.

According to a first preferred form of the invention, the above-described one of the side surfaces of each of the slits corresponds to a tangent plane which is tangent, at the intersection of the above-described one of the side surfaces and the part-cylindrical surface, with respect to the part-cylindrical surface.

According to a second preferred form of the invention, the side surfaces of each of the slits are parallel to the radial direction, and wherein the axis of the above-described cylinder is offset, in the circumferential direction by a predetermined amount, from a center plane between the side surfaces. The axis of the cylinder of each of the slits may lie on an extension of the other of the side surfaces which is other than the above-described one of the side surfaces, so that the circumferential width of the part-cylindrical surface is made about twice as large as the circumferential distance between the side surfaces, thereby further facilitating generation of a large eddy flow of the cutting chips within each slit.

According to a third preferred form of the invention, the above-described one of the side surfaces of each of the slits is located on the forward side of the other of the side surfaces as viewed in a rotating direction of the base disk. This arrangement permits easy formation of the large eddy flow of the cutting chips, since the cutting chips tend to be displaced, from a cutting point in which the work material is cut by the abrasive segment, inwardly in the radial direction of the base disk and forwardly in the rotating direction of the base disk.

According to a fourth preferred form of the invention, the axis of the cylinder of each of the slits lies on a center plane between the side surfaces, and wherein the above-described one of the side surfaces includes a radially-outer-part surface and a radially-inner-part surface which are contiguous to each other, the radially-outer-part surface being parallel to the other of the side surfaces, the radially-inner-part surface being inclined with respect to the radially-outer-part surface such that the radially-inner-part surface corresponds to a tangent plane which is tangent, at the intersection of the radially-inner-part surface and the part-cylindrical surface, so that the part-cylindrical surface is smoothly connected to the above-described one of the side surfaces.

Figure 6:
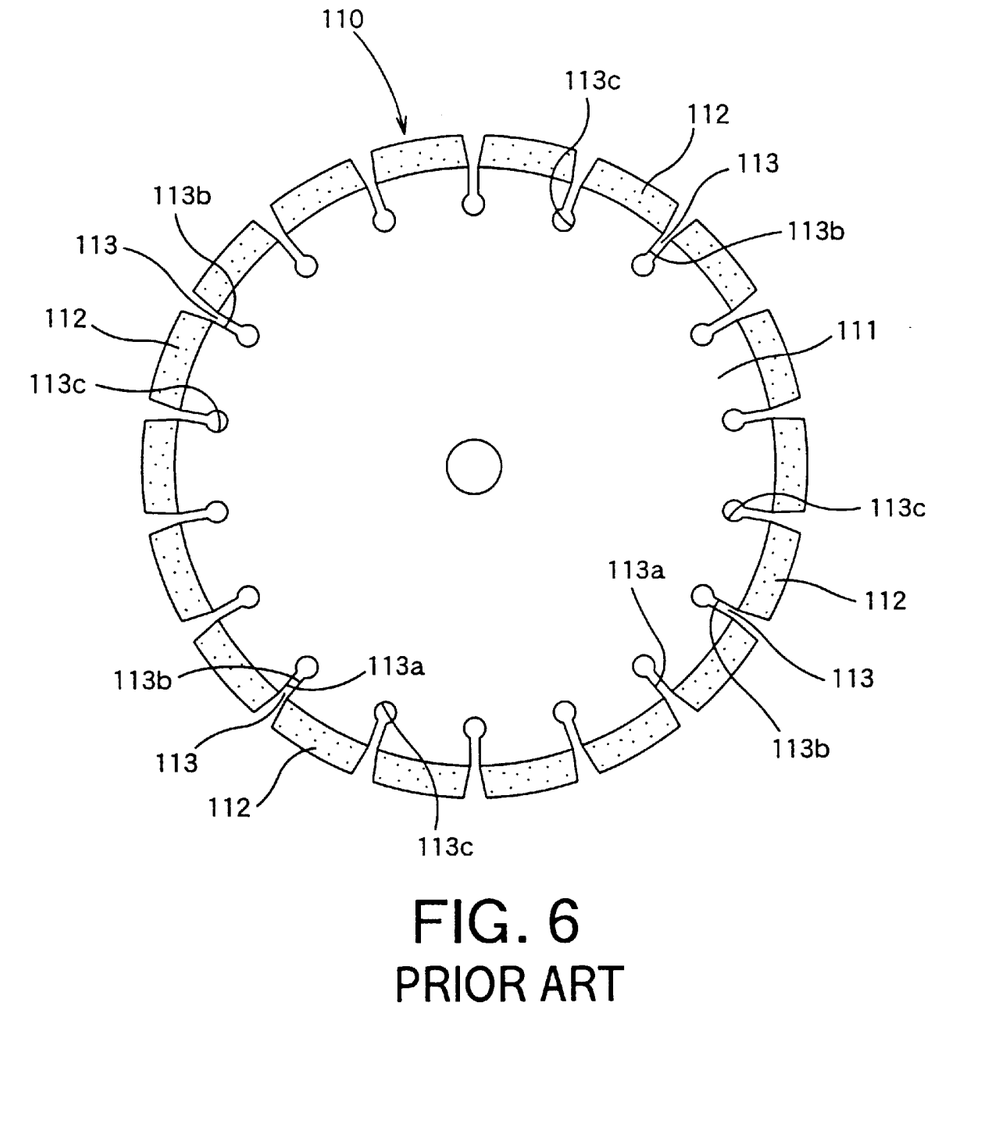
FIG. 6 is a plan view showing a conventional rotary cutting saw.

It is appreciated that each slit 113 of the above-described conventional cutting saw 110 of FIG. 6 has a shape which is identical to a shape defined by the above-described radially-outer-part surface, an extension of the radially-outer-part surface that extends inwardly in the radial direction, the other side surface, and the part-cylindrical surface which intersects with the other side surface and the extension of the radially-outer-part surface. Therefore, the rotary cutting saw of this fourth preferred form of the invention can be produced by slightly modifying the conventional cutting saw, namely, by simply removing a stepped portion, which is located at the intersection of the part-cylindrical surface and the extension of the radially-outer-part surface, down to the above-described radially-inner-part surface.

According to one advantageous arrangement of the fourth preferred form of the invention, the above-described one of the side surfaces of each of the slits is located on the forward side of the other of the side surfaces as viewed in a rotating direction of the base disk.

According to a fifth preferred form of the invention, the slits have respective depths as measured in the radial direction, which depths are different from each other. In the rotary cutting saw of the fifth preferred form of the invention, the cutting chips are prevented from being concentrated at a single radial portion of the base disk, and are easily dispersed so as to be distributed into a plurality of radial portions of the base disk, e.g., a plurality of mutually concentric circles having different radii, thereby leading to an increased efficiency of discharge of the cutting chips from the currently formed groove and an increased efficiency of application of the cutting fluid to the cutting point, so that amount of the wear of the neck portion of the rotary cutting saw is reduced. It is noted that the side surfaces of the slits may have the respective radial lengths different from each other, and that the part-cylindrical surfaces of the slits may have the respective circumferential widths different from each other.

According to a sixth preferred form of the invention, the plurality of slits include at least one first slit and at least one second slit which are alternately arranged in the circumferential direction, the first slit having a depth as measured in the radial direction, which depth is larger than that of the second slit.

In the rotary cutting saw of this sixth preferred form of the invention, the cutting chips are prevented from being concentrated at a single radial portion of the base disk, and are easily dispersed so as to be distributed into a plurality of radial portions of the base disk, e.g., a plurality of mutually concentric circles having different radii, thereby leading to an increased efficiency of discharge of the cutting chips from the currently formed groove and an increased efficiency of application of the cutting fluid to the cutting point, so that amount of the wear of the neck portion of the rotary cutting saw is reduced. For example, the side surfaces of the first slit may have lengths larger than those of the side surfaces of the second slit. The inside diameter of the part-cylindrical surface of the first slit may be larger than the inside diameter of the part-cylindrical surface of the second slit.

In general, an increased amount of the cutting chips or cutting fluid can be accommodated in each slit, with increase of the circumferential distance between the side surfaces of the slit, or with increase of the inside diameter of the part-cylindrical surface, thereby facilitating discharge of the cutting chips from the currently formed groove of the work material as well as application of the cutting fluid to the cutting point. However, the strength of the base disk would be problematically reduced if all of slits have excessively increased sizes. Such a problem can be solved by the arrangement of this fifth preferred form of the invention in which the first slits each having the relatively large size and the second slits each having the relatively small size are alternately arranged in the circumferential direction, for assuring a required degree of strength of the base disk while facilitating the discharge of the cutting chips and the application of the cutting fluid so as to reduce amount of wear of the neck portion of the rotary cutting saw.

The part-cylindrical surface of each of the slits has an inside diameter of, preferably, 8–16 mm, and the ratio of the inside diameter of the part-cylindrical surface of the first slit to that of the part-cylindrical surface of the second slit is, preferably, 1.1–2.0. The depth of each of the slits is, preferably, 10–30 mm, and the ratio of the depth of the first slit to that of the second slit is, preferably, 1.1–3.0.

According to a sixth preferred form of the invention, the rotary cutting saw further includes a wear-resistant chip which has a width not smaller than the axial length of the base disk and which is bonded to one of the side surfaces of each of the slits, so that the wear-resistant chip protects this one of the side surfaces which is a part of the neck portion of the cutting saw, from being worn. The wear-resistant chip may be made of a cemented carbide or any other wear-resistant material. The wear-resistant chip may be attached to any one of the forward and backward side faces.

BRIEF DESCRIPTION OF THE DRAWINGS

The above objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
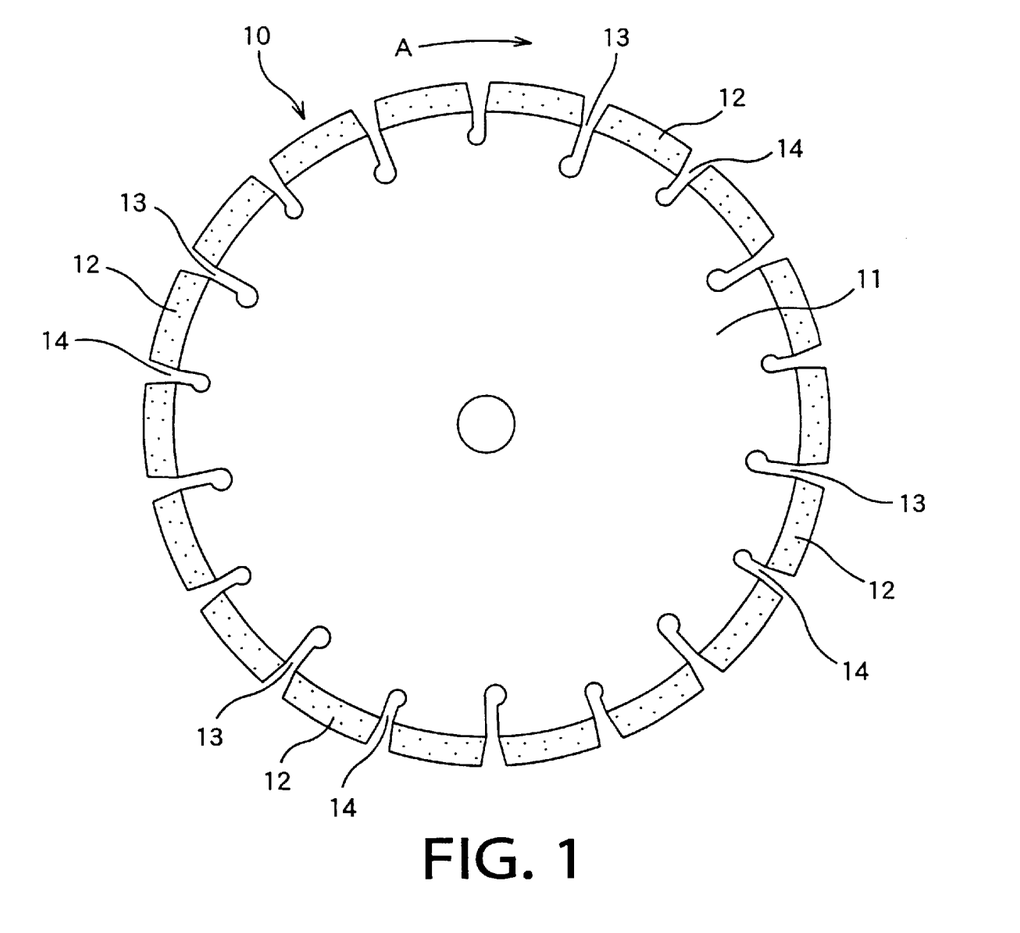
FIG. 1 is a plan view showing a rotary cutting saw according to a first embodiment of this invention.
Figure 2:
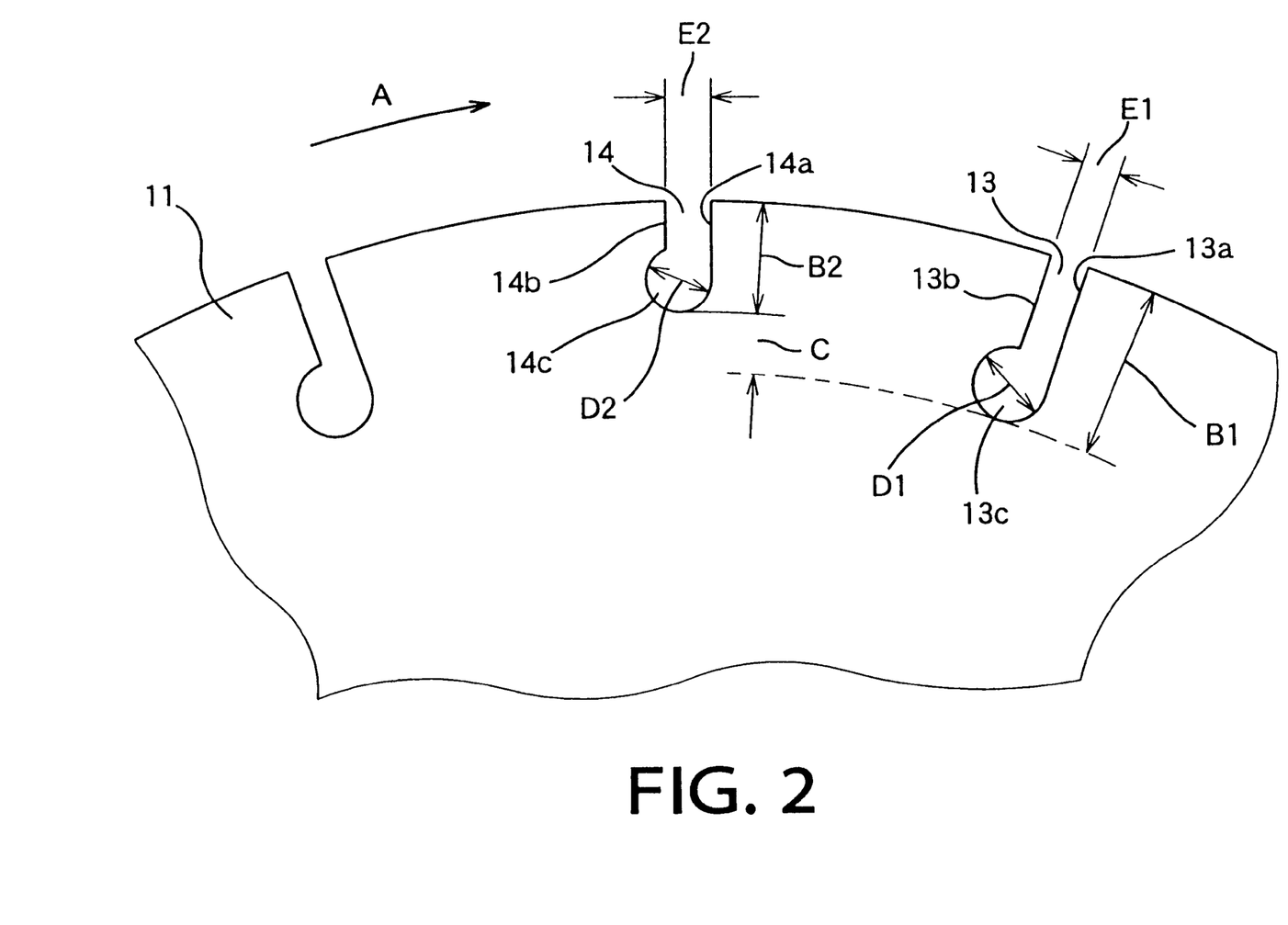
FIG. 2 is an enlarged view showing slits of the cutting saw of FIG. 1.

Referring first to FIGS. 1 and 2, there is shown a rotary cutting saw 10 which is constructed according to a first embodiment of this invention, and which includes a base disk 11 made of a tool steel or other steel, and a plurality of abrasive segments 12 bonded to an outer circumferential surface of the base disk 11. FIG. 1 is a plane view of the rotary cutting saw 10. FIG. 2 is an enlarged view showing a part of the base disk 11 of the rotary cutting saw 10. The rotary cutting saw 10 is a tool which is generally referred to as a cutting saw, a rotary blade, a cutting blade or a grinding wheel, and which is generally used for cutting, parting or grinding an asphalt, a concrete, a building material or other work material, for example. During a cutting or grinding operation with the rotary cutting saw 10, generally, a suitable cutting or grinding fluid such as water is applied to a cutting or grinding point at which the work material is cut or ground by the rotary cutting saw 10.

The abrasive segments 12 are bonded to the outer circumferential surface of the base disk 11 by suitable bonding means such as a brazing, such that the abrasive segments 12 are equally spaced with each other in a circumferential direction of the base disk 11. The base disk 11 has first and second slits 13, 14 each of which is formed in the outer circumferential surface of the base disk 11 so as to be located between the adjacent ones of the abrasive segments 12 in the circumferential direction. The first slits 13 and the second slits 14 are alternately arranged in the circumferential direction, and extend inwardly in a radial direction of the base disk 11 from the outer circumferential surface and also in an axial direction of the base disk 11 over an entire thickness or axial length of the base disk 11. The first and second slits 13, 14 serve to catch therein cutting chips produced at the cutting point during a cutting operation, for removing the cutting chips from a groove being currently formed in the work material. That is, the cutting chips caught in each of the slits 13, 14 are discharged from the slit when the slit comes out of the formed groove by rotation of the rotary cutting saw. It is noted that the number of the abrasive segments 12 is eighteen, and that the base disk 11 has an outside diameter of about 305 mm and the thickness or axial length of 2.4 mm;

The abrasive segment 12 is a piece of grindstone which is generally referred to as a segment chip or diamond chip. The abrasive segment 12 includes diamond abrasive segments or other super abrasive grains which are held together by a metal bond such as a sintered metal, and has a length of about 47 mm as measured in the circumferential direction of the base disk 11, a thickness of about 3.2 mm as measured in the axial direction of the base disk 11, and a height of about 10 mm as measured in the radial direction of the base disk 11.

As shown in FIG. 2, the first slit 13 has a pair of side surfaces 13a, 13b which are parallel to the radial direction of the base disk 11 and are opposed to each other with a predetermined circumferential distance E1 therebetween, and which are connected at radially inner end portions thereof to a part-cylindrical surface 13c having a part-circular shape in a cross section perpendicular to the axial direction of the base disk 11. The part-cylindrical surface 13c has a maximum width as measured in the circumferential direction, which width is larger than the predetermined circumferential distance E1 between the side surfaces 13a, 13b. That is, the part-cylindrical surface 13c has an inside diameter D1 which is larger than the circumferential distance E1.

Similarly, as shown in FIG. 2, the second slit 14 has a pair of opposed side surfaces 14a, 14b which are parallel to the radial direction of the base disk 11 and are opposed to each other with a predetermined circumferential distance E2 therebetween, and which are connected at radially inner end portions thereof to a part-cylindrical surface 14c having a part-circular shape in the cross section perpendicular to the is axial direction of the base disk 11. The part-cylindrical surface 14c has a maximum width as measured in the circumferential direction, which width is larger than the predetermined circumferential distance E2 between the side surfaces 14a, 14b. That is, the part-cylindrical surface 14c has an inside diameter D2 which is larger than the circumferential distance E2.

The first and second slits 13, 14 have respective depths B1, B2 as measured in the radial direction of the base disk 11. The depth B1 of the first slit 13 is larger than the depth B2 of the second slit 14. The side surfaces 13a, 13b of the first slit 13 have radial lengths larger than those of the side surfaces 14a, 14b of the second slit 14. The circumferential maximum width or the inside diameter D1 of the part-cylindrical surface 13c of the first slit 13 is larger than the circumferential maximum width or the inside diameter D2 of the part-cylindrical surface 14c of the second slit 14. The above-described circumferential distance E1, depth B1 and inside diameter D1 of the first slit 13 are about 5 mm, 23 mm and 10 mm, respectively. The above-described circumferential distance E2, depth B2 and inside diameter D2 of the second slit 14 are about 5 mm, 15 mm and 8 mm, respectively.

The shapes of the first and second slits 13, 14 are suitably designed such that wear of a neck portion of the cutting saw 10, i.e., wear of the radially outer end portion of the base disk 11 which is radially adjacent to the abrasive segments 12 is minimized during a cutting operation with the cutting saw 10. Specifically described, the part-cylindrical surface 13c is a part of a cylinder having an axis which is offset from a center plane between the side surfaces 13a, 13b toward a direction opposed to a rotating direction A of the base disk 11, and which lies on an extension of the surface 13b that is located on the rear side of the surface 13a as viewed in the rotating direction A. The forward side surface 13a corresponds to a tangent plane which is tangent, at the intersection of the forward side surface 13a and the part-cylindrical surface 13c, with respect to the part-cylindrical surface 13c, so that the forward side surface 13a is smoothly connected to the part-cylindrical surface 13c without a ridge line or stepped portion therebetween. Similarly, the part-cylindrical surface 14c is a part of a cylinder having an axis which is offset from a center plane between the side surfaces 14a, 14b toward a direction opposed to the rotating direction A. The forward side surface 14a corresponds to a tangent plane which is tangent, at the intersection of the forward side surface 14a and the part-cylindrical surface 14c, with respect to the part-cylindrical surface 14c, so that the forward side surface 14a is smoothly connected to the part-cylindrical surface 14c without a ridge line or stepped portion therebetween.

As described above, in the cutting saw 10 of the present invention, the maximum width of the part-cylindrical surface 13c of each first slit 13 as measured in the circumferential direction of the base disk 11 is larger than the circumferential distance between the radially inner end portions of the respective side surfaces 13a, 13b, and the maximum width of the part-cylindrical surface 14c of each second slit 14 as measured in the circumferential direction is larger than the circumferential distance between the radially inner end portions of the respective side surfaces 14a, 14b. Further, the forward side surface 13a is smoothly connected to the part-cylindrical surface 13c without a stepped portion therebetween, and the forward side surface 14a is smoothly connected to the part-cylindrical surface 14c without a stepped portion therebetween. This shape of each slit 13, 14 facilitates formation of a single or small number of comparatively large eddy flows of the cutting chips within each slit 13, 14 in the cutting operation. The large eddy flow advantageously impedes movements of the cutting chips out of each slit 13, 14, or facilitates movements of the cutting chips into the each slit 13, 14, so that an increased amount of the cutting chips is separated from or taken away from the groove being currently formed in the work material, after the slit comes out of the groove with the rotation of the cutting saw 10, thereby advantageously resulting in a reduced amount of wear of the radially outer end portion of the base disk 11, i.e., the neck portion of the rotary cutting saw 10. A wear-resistant chip, as described below, does not necessarily have to be attached to one of the side surfaces of each slit 13, 14. That is, the wear-resistant chip is not essential for obtaining the above-described advantage. Therefore, the present rotary cutting saw 10 does not suffer from a reduced cutting performance or a reduced durability which could be caused by a reduced efficiency of discharge of the cutting chips or a reduced efficiency of application of the cutting fluid due to the presence of the wear-resistant chip.

The forward side surface 13a is connected to the part-cylindrical surfaces 13c in each first slit 13, such that the forward side surface 13a corresponds to a tangent plane which is tangent, at the intersection of the forward side surface 13a and the part-cylindrical surface 13c, with respect to the part-cylindrical surface 13c. Similarly, the forward side surface 14a is connected to the part-cylindrical surfaces 14c in each second slit 14, such that the forward side surface 14a corresponds to a tangent plane which is tangent, at the intersection of the forward side surface 14a and the part-cylindrical surface 14c, with respect to the part-cylindrical surface 14c. Accordingly, the forward side surfaces 13a, 14a are smoothly connected to the part-cylindrical surfaces 13c, 14c.

The opposed side surfaces 13a, 13b of the slits 13 and the side surfaces 14a, 14b of the slits 14 are parallel to the radial direction of the base disk 11. The part-cylindrical surface 13c has a predetermined radius of curvature, e.g., of 5 mm, and the axis which is offset, in the circumferential direction by the predetermined amount, from the center plane between the side surfaces 13a, 13b. The part-cylindrical surface 14c has a predetermined radius of curvature, e.g., of 4 mm, and the axis which is offset, in the circumferential direction by the predetermined amount, from the center plane between the side surfaces 14a, 14b. Thus, the side surfaces 13a, 13b are connected to each other by the part-cylindrical surface 13c, thereby facilitating generation of a large eddy flow of the cutting chips within each slit 13. Similarly, the side surfaces 14a, 14b are connected to each other by the part-cylindrical surface 14c, thereby facilitating generation of a large eddy flow of the cutting chips within each slit 13.

The axis of the part-cylindrical surface 13c is located on an extension of one of the side surfaces 13a, 13b, so that the inside diameter of the part-cylindrical surface 13c is about twice as large as the circumferential distance between the side surfaces 13a, 13b, thereby facilitating generation of a large eddy flow of the cutting chips within each slit 13.

The forward side surfaces 13a, 14a, which are respectively connected to the part-cylindrical surfaces 13c, 14c without stepped portions therebetween, are located on the downstream side, i.e., forward side of the backward side surfaces 13b, 14b, as viewed in a rotating direction A of the base disk 11. This arrangement facilitates generation of a large eddy flow of the cutting chips within each slit 13 or 14, where the produced cutting chips tend to be displaced from the abrasive segment 12 inwardly in the radial direction and forwardly in the rotating direction.

The first and second slits 13, 14, which are arranged in a predetermined order or alternately to each other as viewed in the circumferential direction of the base disk 11, have the respective depths or radial lengths B1, B2 different from each other. This arrangement prevents the cutting chips, which are not caught in the slits 13, 14, from flowing along a single circle having a given radius, namely, prevents the cutting chips from being concentrated at a single radial position of the base disk, and facilitates the cutting chips to be dispersed so as to be distributed into a plurality of radial portions of the base disk, e.g., a plurality of mutually concentric circles having different radii, thereby improving the efficiency of discharge of the cutting chips and the efficiency of application of the cutting fluid, and accordingly resulting in a further reduced amount of the wear of the neck portion of the rotary cutting saw is reduced.

The side surfaces 13a, 13b of the first slit 13 have lengths larger than those of the side surfaces 14a, 14b of the second slit 14. The inside diameter D1 of the part-cylindrical surface 13c of the first slit 13 is larger than the inside diameter D2 of the part-cylindrical surface 14c of the second slit 14. In general, an increased amount of the cutting chips or cutting fluid can be held in each slit, with increase of the circumferential distance between the side surfaces of the slit, or with increase of the inside diameter of the part-cylindrical surface, thereby facilitating discharge of the cutting chips from the currently formed groove of the work material as well as application of the cutting fluid to the cutting point. However, the strength of the base disk would be undesirably reduced if all of slits have increased sizes. In the cutting saw 10 of the present invention, the first slits 13 each having the relatively large size and the second slits 14 each having the relatively small size are alternately arranged in the circumferential direction, for assuring a required degree of strength of the base disk 11 while facilitating the discharge of the cutting chips and the application of the cutting fluid so as to reduce amount of wear of the neck portion of the rotary cutting saw 10.

The inside diameters D1, D2 of the part-cylindrical surfaces 13c, 14c of the first and second slits 13, 14 are 8–16 mm. The ratio of the inside diameter D1 to the inside diameter D2 is 1.1–2.0 (D1/D2=1.1–2.0). The depths B1, B2 of the first and second slits 13, 14 are 10–30 mm. The ratio of the depth B1 of the first slit 13 to the depth B2 of the second slit 14 is 1.1–3.0 (B1/B2=1.1–3.0). If the inside diameters D1, D2 are smaller than 8 mm or if the depths B1, B2 are smaller than 10 mm, the amount of the wear of the neck portion of the cutting saw is not satisfactorily reduced. On the other hand, if the inside diameters D1, D2 are larger than 16 mm or if the depths B1, B2 are larger than 30 mm, the strength of the base disk 11 is excessively reduced. If the above-described ratio of the inside diameter D1 to the inside diameter D2 is smaller than 1.1 (D1/D2<1.1) or if the above-described ratio of the depth B1 to the depth B2 is smaller than 1.1 (B1/B2<1.1), the cutting chips are undesirably concentrated at a single radial portion of the base disk 11. If the ratio of the inside diameter D1 to the inside diameter D2 is larger than 2.0 (D1/D2>2.0) or if the ratio of the depth B1 to the depth B2 is larger than 3.0 (B1/B2>3.0), the amount of the cutting fluid applied to the cutting point is reduced, and the flexural strength of the radially outer end portion of the base disk is excessively reduced.

There will be described other embodiments of the present invention, by reference to FIGS. 3, 4 and 5, wherein the same reference numerals as used in the above-described first embodiment are used to identify the corresponding components or elements. No redundant description of these components or elements will be provided, in the interest of simplification of the description.

Figure 3:
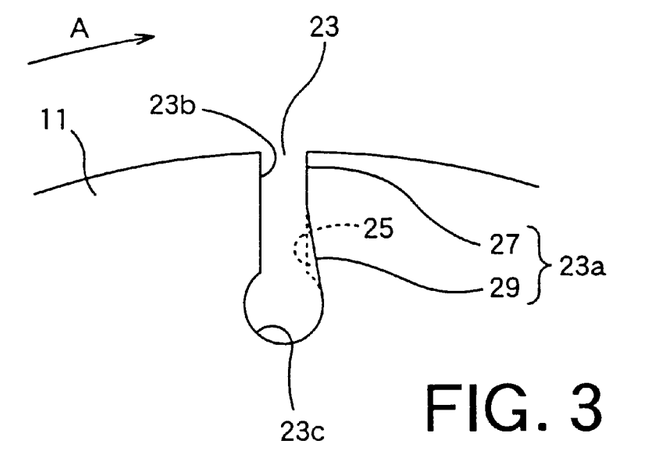
FIG. 3 is an enlarged view showing a slit of a rotary cutting saw according to a second embodiment of the invention.

FIG. 3 is an enlarged view of a rotary cutting saw constructed according to a second embodiment of this invention. The base disk 11 of the present rotary cutting saw has first slits 23 which are somewhat different in shape from the first slits 13 of the rotary cutting saw 10 of the first embodiment. Specifically, a forward side surface 23a, which is a forward side one of the opposed side surfaces 23a, 23b as viewed in the rotating direction, includes a radially-outer-part surface 27 and a radially-inner-part surface 29 which are contiguous to each other. The radially-outer-part surface 27 is parallel to the backward side surface 23b. The radially-inner-part surface 29 is not parallel to the backward side surface 23b and is inclined with respect to the radially-outer-part surface 27 such that the radially-inner-part surface 29 corresponds to a tangent plane which is tangent, at the intersection of the radially inner part 29 and a part-cylindrical surface 23c defining a part of a cylinder whose axis lies on a center plane between the side surfaces 23a, 23b, whereby the radially-inner-part surface 29 of the forward side surface 23a is smoothly connected to the part-cylindrical surface 23c without a stepped portion therebetween. The radially-inner-part surface 29 of the forward side surface 23a may be formed by removing a shoulder portion 25 located at the intersection of an extension of the radially-outer-part surface 27 of the forward side surface 23a and the part-cylindrical surface 23c.

It is appreciated that the first slit 23 has a shape which is substantially identical with the slit 113 in the above-described conventional rotary cutting saw 110, except that the forward side surface 23a includes the two part surfaces 27, 29 which are inclined with respect to each other. In this view, the first slit 23 in the present rotary cutting saw may be formed by slightly modifying the slit 113 in the conventional rotary cutting saw, namely, by simply removing a shoulder portion located at the intersection of the forward side surface 113a and the part-cylindrical surface 113c. Thus, a conventional cutting saw as the cutting saw 110 can be utilized to form the rotary cutting saw of the present second embodiment.

Figure 4:
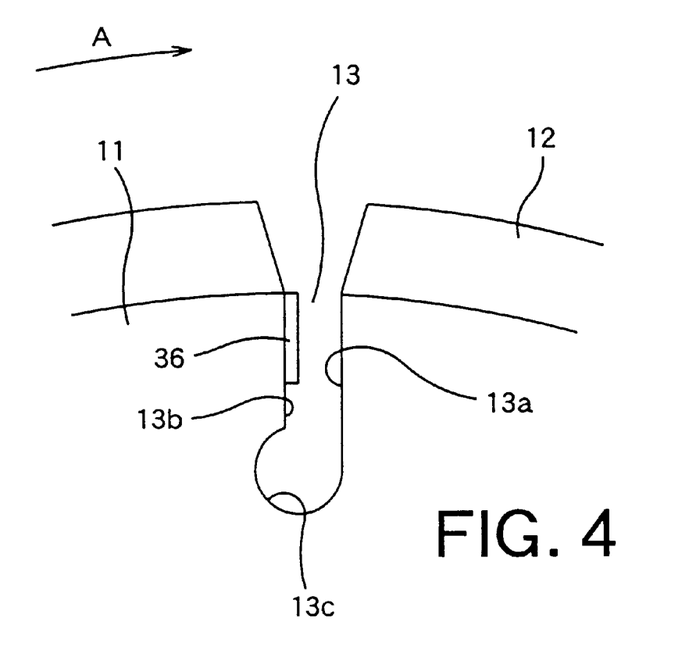
FIG. 4 is an enlarged view showing a slit of a rotary cutting saw according to a third embodiment of the invention.

FIG. 4 is an enlarged view of a rotary cutting saw constructed according to a third embodiment of this invention. This rotary cutting saw is identical to the rotary cutting saw 10 of the first embodiment except for the provision of a wear-resistant chip 36 in one of the side surfaces 13a, 13b of the first slit 13. The wear-resistant chip 36 is formed of a cemented carbide, and has a width which is not smaller than the axial length of the base disk 11 and which is not larger than the width of each abrasive segment 12 that is measured in the axial direction of the rotary cutting saw 10. The wear-resistant chip 36 is bonded, by s suitable bonding means such as a brazing, for example, to the backward side surface 13b which is a rear side or upstream side one of the side surfaces 13a, 13b. The wear-resistant chip 36 serves as a wiper for preventing the cutting chips from being displaced into a small gap between the base disk and each side surface of the currently formed groove. Thus, a part of the neck portion, which is located on the rear side of the wear-resistant chip 36 in the rotating direction, is protected, owing to a high degree of wear resistance of the wear-resistant chip 36, from being worn.

Figure 5:
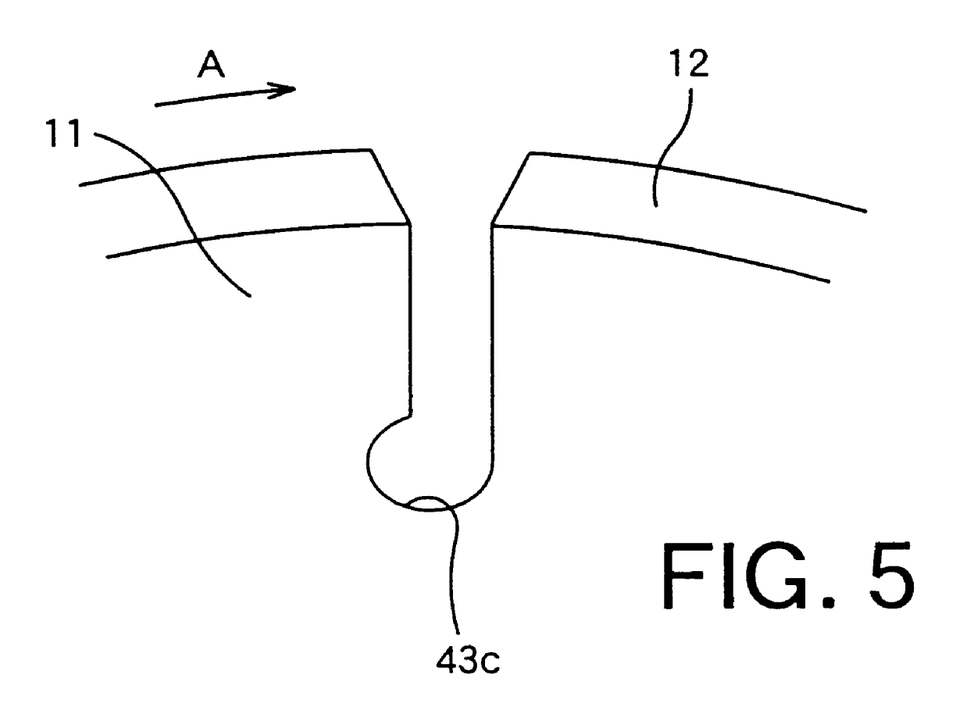
FIG. 5 is an enlarged view showing a slit of a rotary cutting saw according to a fourth embodiment of the invention.

FIG. 5 is an enlarged view of a rotary cutting saw constructed according to a fourth embodiment of this invention, which is identical to the rotary cutting saw 10 of the first embodiment except for the shape of a part-cylindrical surface 43c of each slit. While the cylinder partially defined by the part-cylindrical surface 13c of each slit in the rotary cutting saw 10 of the first embodiment has the circular shape in the cross section perpendicular to the axial direction, a cylinder partially defined by the part-cylindrical surface 43c of each slit in this rotary cutting saw has a elliptical shape in the cross section.

There will be described an actual cutting test which was conducted to confirm the advantage provided by the present invention, namely, by the shape of the slit according to the present invention. In the test, there were used ten rotary cutting saws consisting of Examples 1–7 each of which has a shape identical to that of the rotary cutting saw 10 of the above-described first embodiment of the present invention and which have respective sizes different from each other, Example 8 has a wear-resistant chip bonded to the rear side one of the side surfaces of each slit as in the rotary cutting saw of the above-described third embodiment, Example 9 in which the axis of the part-cylindrical surface lies not on an extension of the rear side one of the side surfaces but on an extension of the forward side one of the side surfaces, and Comparative Example which is identical to the conventional rotary cutting saw of FIG. 6. Table 1 indicates a cutting condition in which the cutting test was conducted. Table 2 indicates the dimensions of each rotary cutting saw and the result of the cutting test as to each rotary cutting saw. It is noted that each of the rotary cutting saw of Examples 3–9 has two types of slits which are different from each other in depth and/or in inside diameter of the part-cylindrical surface, as indicated in Table 2. It is also noted that the "Cutting Speed" represents a measured length of the groove which was formed per minute, and the "Duration" represents a measured length of the groove which was formed until the amount of wear of the abrasive segment as measured in the radial direction was increased to a predetermined amount.

TABLE 1

| | |
|---|---|
| Size of Cutting saw | 14" (373 D x 47 L x 3.3 T x 9.3 X x 2.5 E x 21 N) |
| Fatal Abrasive Layer | SD: 30    Concentricity: 30 Bonding Agent: Metal Bond |
| Cutting Machine | Car-type Engine Cutter (max power 50 HP) |
| Number of Revolutions | 2400 rpm |
| Depth of Cut | 100 mm |
| Amount of Cutting Fluid | 4 liters/min |
| Work Material | Asphalt Road Surface |

TABLE 2

| | Inside Diam. of Part-Cylindrical Surface of Slit (mm) | Depth of Slit (mm) | Cutting Speed (m/min) | Duration (m) |
|---|---|---|---|---|
| Example 1 | 8 | 19 | 5.8 | 3450 |
| Example 2 | 10 | 19 | 6.4 | 3652 |
| Example 3 | 8 | 19 & 15 | 6.0 | 3700 |
| Example 4 | 8 | 23 & 15 | 6.0 | 3950 |
| Example 5 | 10 & 8 | 19 & 15 | 6.8 | 4064 |
| Example 6 | 10 & 8 | 23 & 15 | 7.1 | 6300 |
| Example 7 | 12 & 8 | 19 & 15 | 6.0 | 3600 |
| Example 8 | 10 & 8 | 23 & 15 | 7.0 | 7500 |
| Example 9 | 12 & 8 | 19 & 15 | 5.7 | 3110 |
| Comparative Example | 8 | 19 | 3.8 | 2500 |

As is apparent from Table 2, each of Examples 1–7, in which the axis of the part-cylindrical surface is offset from the center plane between the side surfaces in a direction opposed to the rotating direction, exhibited a cutting speed increased as high as 1.5–1.9 times of that of Comparative Example and a duration increased as high as 1.4–2.5 times of that of Comparative Example in which the axis of the part-cylindrical surface is not offset from the center plane between the side surfaces. Example 8, in which the cemented-carbide chip was bonded to the rear side one of the side surfaces of each slit, exhibited further increased cutting speed and duration. Example 9, in which the axis of the part-cylindrical surface is offset from the center plane in the rotating direction, exhibited improved cutting speed and duration over Comparative Example. However, the cutting speed and duration of Example 9 are not so improved as those of Example 7 which is identical, in depth and in inside diameter of the part-cylindrical surface, to Example 9.

While the presently preferred embodiments of this invention have been described in detail, for illustrative purpose only, it is to be understood that the present invention is not limited to the details of the illustrated embodiments, but may be otherwise embodied.

While the side surfaces 13a, 13b of the first slits 13 and the side surfaces 14a, 14b of the second slits 14 are parallel to the radial direction of the base disk 11 in the above-illustrated embodiments, these side surfaces may be inclined with respect to the radial direction.

The side surfaces 13a, 13b of the first slits 13 are parallel to each other and the side surfaces 14a, 14b of the second slits 14 are parallel to each other in the above-illustrated embodiments. However, these side surfaces may be inclined with respect to each other, for example, such that the circumferential distance therebetween increases as the side surfaces extend outwardly in the radial direction.

While the base disk 11 has two types of slits formed therein, i.e., the first and second slits 13, 14 which are different from each other in size or depth, more than three types of slits having respective different sizes or depths may be formed in the base disk and arranged in a predetermined order in the circumferential direction.

It is to be understood that the present invention may be embodied with various other changes, modifications and improvements, which may occur to those skilled in the art, without departing from the spirit and scope of the invention defined by the following claims:

What is claimed is:

1. A rotary cutting saw to be used in an operation for forming a groove in a work material, comprising:
    a base disk; and
    a plurality of abrasive segments which are bonded to an outer circumferential surface of said base disk so as to be spaced apart from each other in a circumferential direction of said base disk;
    wherein said base disk has a plurality of slits for catching therein cutting chips produced during said operation, said plurality of slits being formed in said outer circumferential surface of said base disk so as to be located between adjacent ones of said abrasive segments in said circumferential direction, each of said plurality of slits extending inwardly in a radial direction of said base disk from said outer circumferential surface of said base disk, and extending in an axial direction of said base disk over an entire axial length of said base disk;
    wherein each of said slits is defined by a pair of side surfaces opposed to each other in said circumferential direction, and a part-cylindrical surface defining a part of a cylinder having an axis which is parallel to said axial direction, said side surfaces being connected at radially inner end portions thereof to said part-cylindrical surface;
    wherein said part-cylindrical surface has a width as measured in said circumferential direction, which width is larger than a circumferential distance between said radially inner end portions of said side surfaces;
    wherein said part-cylindrical surface is smoothly connected to one of said side surfaces without a stepped portion therebetween;
    and wherein said one of said side surfaces of each of said slits is located on a forward side of the other of said side surfaces as viewed in a rotating direction of said base disk.

2. A rotary cutting saw according to claim 1, wherein said one of said side surfaces of each of said slits corresponds to a tangent plane which is tangent, at the intersection of said one of said side surfaces and said part-cylindrical surface, with respect to said part-cylindrical surface.

3. A rotary cutting saw according to claim 1, wherein said side surfaces of each of said slits are parallel to said radial direction, and wherein said axis of said cylinder partially defined by said part-cylindrical surface is offset, in said circumferential direction by a predetermined amount, from a center plane between said side surfaces.

4. A rotary cutting saw according to claim 3, wherein said axis of said cylinder lies on an extension of the other of said side surfaces which is other than said one of said side surfaces.

5. A rotary cutting saw according to claim 1, wherein said axis of said cylinder partially defined by said part-cylindrical surface lies on a center plane between said side surfaces, and wherein said one of said side surfaces includes a radially-outer-part surface and a radially-inner-part surface which are contiguous to each other, said radially-outer-part surface being parallel to the other of said side surfaces, said radially-inner-part surface being inclined with respect to said radially-outer-part surface such that said radially-inner-part surface corresponds to a tangent plane which is tangent, at the intersection of said radially-inner-part surface and said part-cylindrical surface, so that said part-cylindrical surface is smoothly connected to said one of said side surfaces.

6. A rotary cutting saw according to claim 1, wherein said plurality of slits have respective depths as measured in said radial direction, which depths are different from each other.

7. A rotary cutting saw according to claim 1, wherein said plurality of slits include at least one first slit and at least one second slit which are alternately arranged in said circumferential direction, said first slit having a depth as measured in said radial direction, which depth is larger than that of said second slit.

8. A rotary cutting saw according to claim 7, wherein said part-cylindrical surface of each of said slits has an inside diameter of 8–16 mm, and wherein the ratio of said inside diameter of said part-cylindrical surface of said first slit to that of said part-cylindrical surface of said second slit is 1.1–2.0.

9. A rotary cutting saw according to claim 7, wherein said depth of each of said slits is 10–30 mm, and wherein the ratio of said depth of said first slit to that of said second slit is 1.1–3.0.

10. A rotary cutting saw according to claim 1, further comprising a wear-resistant chip which has a width not smaller than said axial length of said base disk and which is bonded to one of said side surfaces of each of said slits.

11. A rotary cutting saw according to claim 1, wherein said cylinder partially defined by said part-cylindrical surface of each of said slits has a circular shape in a cross section perpendicular to said axial direction.

12. A rotary cutting saw according to claim 1, wherein said cylinder partially defined by said part-cylindrical surface of each of said slits has a elliptical shape in a cross section perpendicular to said axial direction.

* * * * *